United States Patent [19]
Devenyi

[11] Patent Number: 5,533,417
[45] Date of Patent: Jul. 9, 1996

[54] LEADSCREW ASSEMBLY

[75] Inventor: Gabor Devenyi, Pentang, Canada

[73] Assignee: Hughes Aircraft Company, Los Angeles, Calif.

[21] Appl. No.: 46,057

[22] Filed: Apr. 12, 1993

[51] Int. Cl.⁶ .................................................. F16H 25/22
[52] U.S. Cl. ......................... 74/424.8 R; 74/441; 74/459
[58] Field of Search ................... 74/89, 89.15, 424.8 R, 74/441, 459

[56] References Cited

U.S. PATENT DOCUMENTS

| | | | |
|---|---|---|---|
| 2,482,082 | 9/1949 | Wahlberg | 74/424.8 C |
| 2,616,302 | 11/1952 | Wahlmark | 74/459 |
| 2,940,322 | 6/1960 | Uhing | 74/459 X |
| 3,614,900 | 10/1971 | Wahlmark | 74/424.8 R |
| 3,698,258 | 10/1972 | Gartner | 74/424.8 R |
| 4,403,522 | 9/1983 | Kumpar | 74/89 |
| 4,794,810 | 1/1989 | Parsons | 74/424.8 R |
| 4,856,356 | 8/1989 | Gartner | 74/424.8 R X |

FOREIGN PATENT DOCUMENTS

| | | | |
|---|---|---|---|
| 3106221 | 10/1982 | Germany | 74/459 |
| 3225496 | 1/1984 | Germany | 74/459 |
| 59-9351 | 1/1984 | Japan | 74/424.8 R |
| WO84/04143 | 10/1984 | WIPO | 74/424.8 R |

Primary Examiner—Allan D. Herrmann
Attorney, Agent, or Firm—Hugh P. Gortler; Michael W. Sales; Wanda K. Denson-Low

[57] ABSTRACT

A leadscrew assembly (10, 52, 82) having an externally threaded leadscrew (12) and first and second ball bearings (16, 18) disposed such that a segment of the inner races (24, 26) thereof makes contact with diametrically opposing portions of the leadscrew (12).

27 Claims, 5 Drawing Sheets

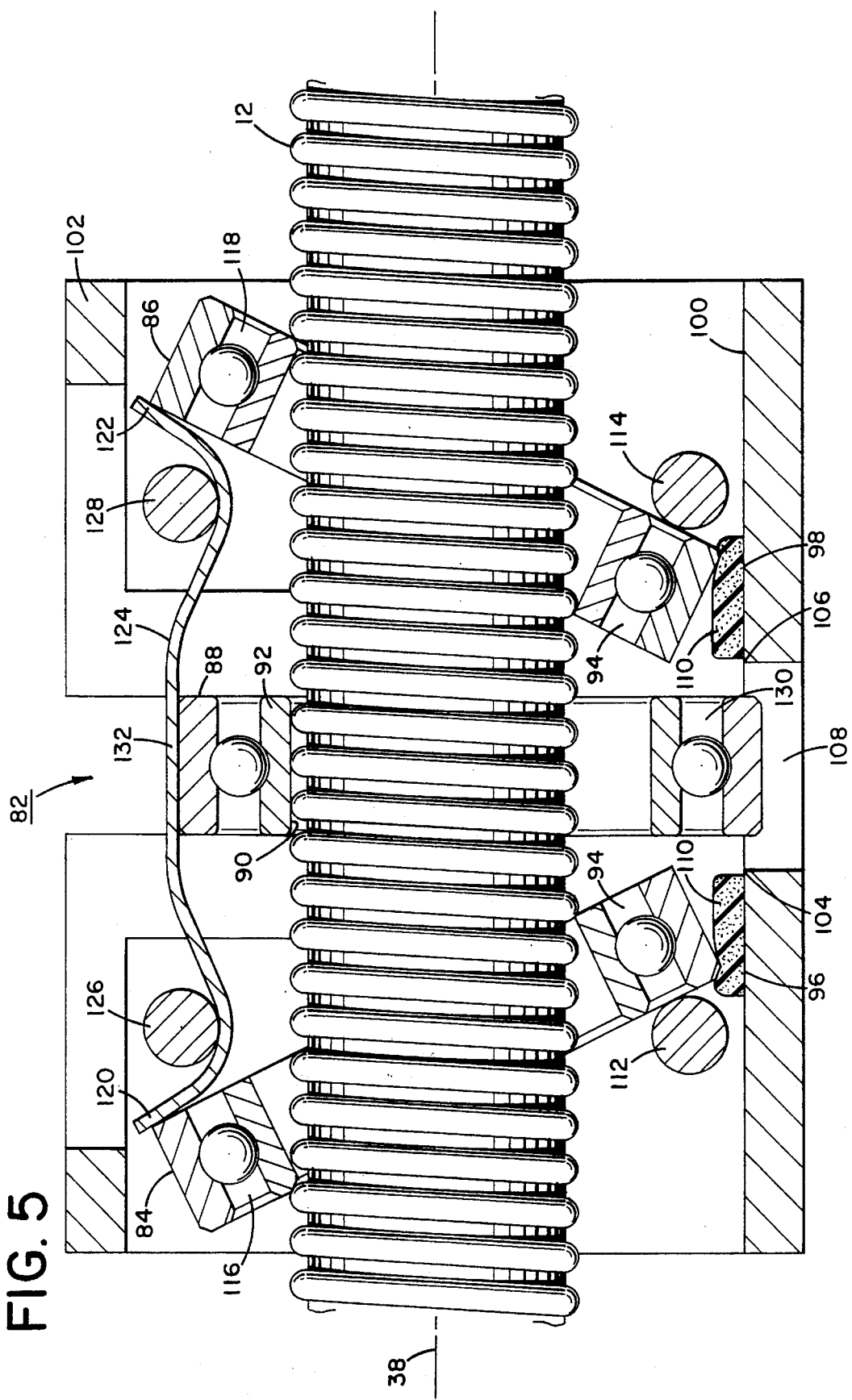

LEADSCREW ASSEMBLY

BACKGROUND OF THE INVENTION

The present invention generally relates to a leadscrew assembly and, in particular, relates to one such leadscrew assembly having a roller nut interface with a leadscrew.

Leadscrew arrangements are known in the art and are used to convert rotary motion of a shaft of a screw into linear motion of a fixture interfacing with the screw.

Typically, for discussion purposes, conventional precision leadscrew arrangements are separable into two categories, i.e. those arrangements having a static nut and those arrangements having a recirculating ball nut. Typically, a static nut/leadscrew arrangement employs a solid internally threaded nut and a solid leadscrew. A recirculating ball nut/leadscrew arrangement typically utilizes a nut of recirculating steel balls and a specially threaded steel shaft.

Both of these arrangements have drawbacks that must be accepted and dealt with in deciding which arrangement to use for a given application. The static nut/leadscrew arrangement is relatively inexpensive but exhibits rather high friction and excessive wear. As such, the static nut/leadscrew arrangement requires frequent lubrication and monitoring. As a result certain constraints are placed upon any system employing such an arrangement to ensure proper and appropriate lubrication.

The recirculating ball nut/leadscrew arrangement, while requiring a minimum lubrication does, however, require a ball recirculating mechanism that is space consuming. Typically, such an arrangement is relatively expensive, although it is a more precise mechanism than comparable static nut/leadscrew arrangements. Nevertheless, such a mechanism limits the pitch of the leadscrew to be coarse or have a high pitch, that necessitates the use of a torque increasing gearbox between the drive motor and the leadscrew, introducing backlash and other attendant difficulties into the rotary to linear motion conversion.

It is clear from the above discussion that a leadscrew arrangement that overcomes the above recited difficulties of high friction, frequent lubrication, and which eliminates the requirement for a torque increasing device and which is relatively inexpensive is very much needed and desirable in the precision leadscrew field.

SUMMARY OF THE INVENTION

Accordingly, it is one object of the present invention to provide a leadscrew assembly that substantially completely overcomes the above recited drawbacks associated with currently available leadscrew arrangements.

This object is accomplished, at least in part, by a leadscrew assembly having an externally threaded leadscrew and first and second ball bearings disposed such that a segment of the inner races thereof makes contact with diametrically opposing portions of the leadscrew.

Other objects and advantages of the present invention will become apparent to those skilled in the art from the following detailed description of the invention read in conjunction with the appended claims and the drawing attached hereto.

BRIEF DESCRIPTION OF THE DRAWINGS

The drawing, not drawn to scale, includes

FIGS. 5 is a cross-sectional views of still another leadscrew assembly embodying the principles of the present invention.

DETAILED DESCRIPTION OF THE INVENTION

Figure 1:
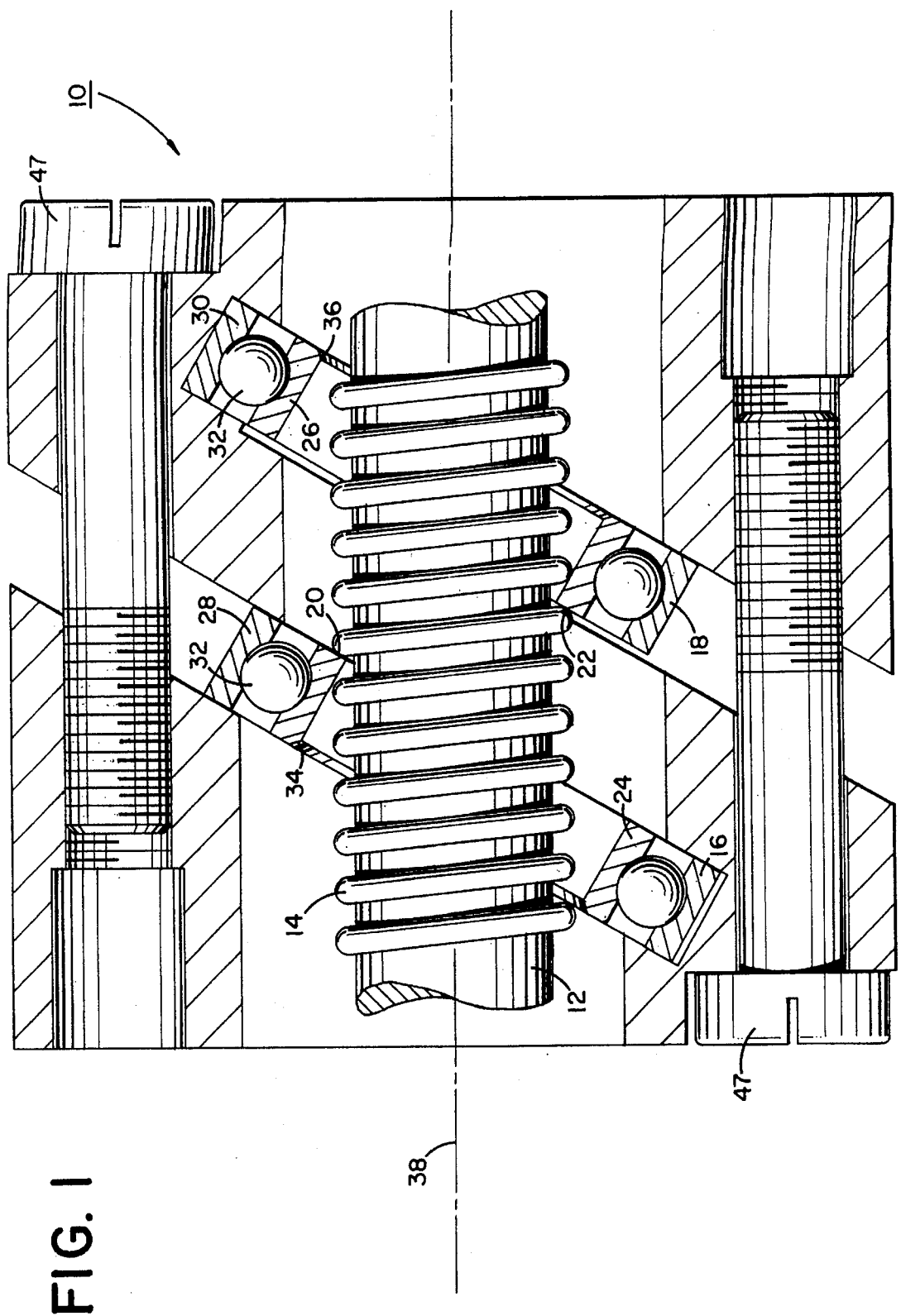
FIG. 1 which is a cross-sectional view of one embodiment of a leadscrew assembly embodying the principles of the present invention.

A leadscrew assembly, generally indicated at 10 in FIG. 1 and embodying the principles of the present invention, includes a leadscrew 12 having an external thread 14, first and second ball bearings, 16 and 18, respectively, disposed such that they contact first and second diametrically opposing portions, 20 and 22, respectively, of the thread 14 of the leadscrew 12.

In one of preferred embodiment, each of the bearings, 16 and 18, respectively, includes an inner race, 24 and 26, respectively, and outer race, 28 and 30, respectively, each having a plurality of balls 32 disposed therebetween. Preferably, as discussed below, at least one edge, 34 and 36, respectively, of each of the inner races, 24 and 26, is chamfered.

The first and second bearings, 16 and 18, respectively, are disposed to accommodate the thread 14 of the leadscrew 12 by being tilted in accordance with the tracking angle of the thread 14 of the leadscrew 12 as well as the helix angle thereof. As used herein, the tracking angle of the thread 14 of the leadscrew 12 is that angle of each of the individual threads 14 with respect to the axis 38 of rotation of the leadscrew 12. The helix angle is that angle that each of the threads 14 transverse to the axis 38 of rotation of the leadscrew 12. In the preferred embodiment, the tracking angle of the leadscrew 12 is between 15 to 30 degrees although a 30 degree angle has been found to work particularly well. It will be understood by those skilled in the art, that the present invention will function more efficiently and accurately if the tracking angle and helix angle of the ball bearings, 16 and 18, are accurately located with respect to the those corresponding angles of the leadscrew 12.

Figure 2:
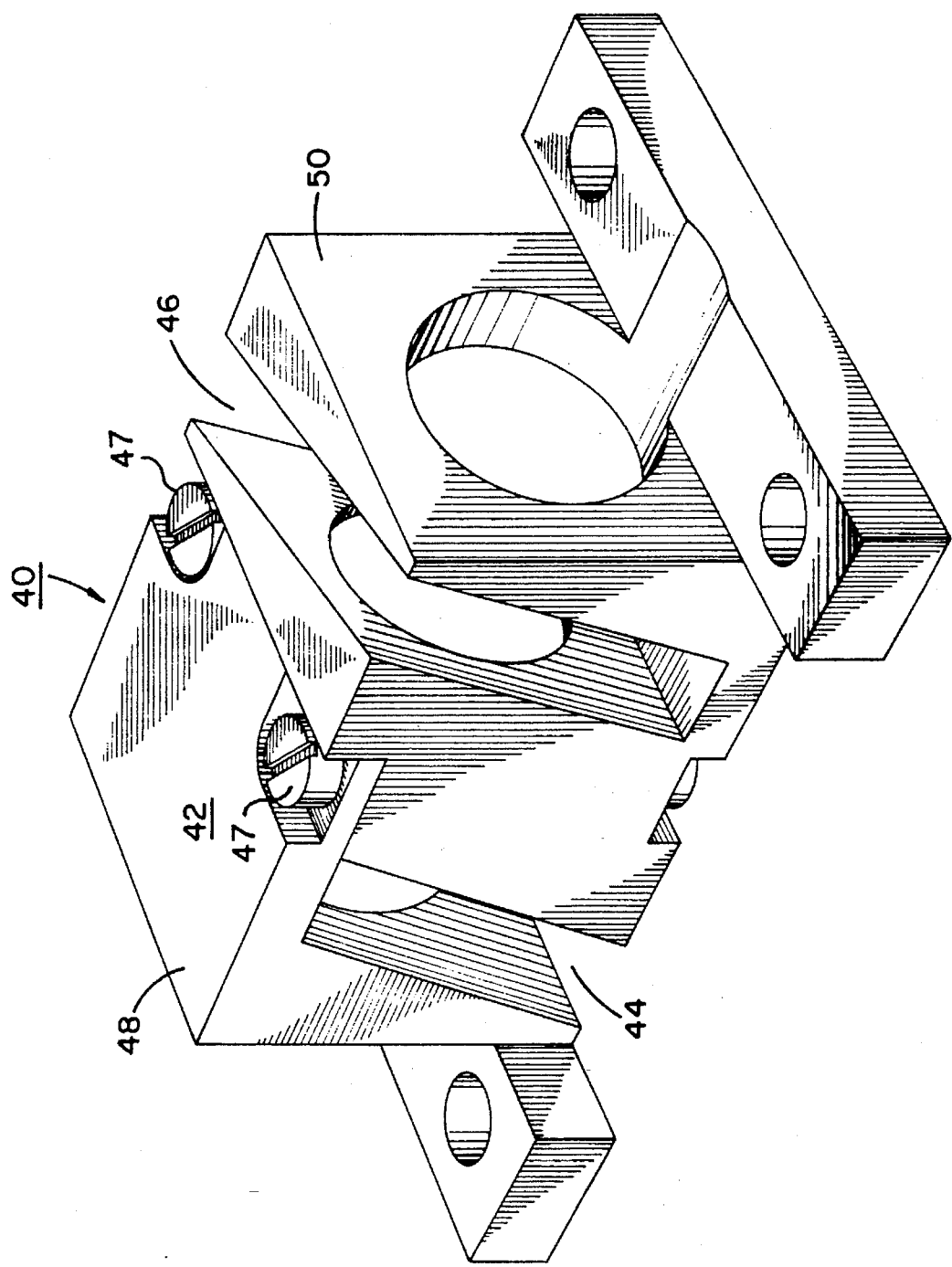
FIG. 2 which is a perspective view of a housing member adapted for use in conjunction with the present invention.

In one preferred embodiment, the disposition of the ball bearings, 16 and 18, is accomplished by means of a specially designed housing member 40 such as that shown in FIG. 2. As shown therein, the housing member 40 includes a body 42 that includes first and second slots, 44 and 46, respectively, therein. The slots, 44 and 46, are sized to receive the ball bearings, 16 and 18, therein. In one embodiment, the ball bearings, 16 and 18, are positioned into the slots, 44 and 46, and generally secured therein by retention means 47 which can be, for example, bolts 47 extending across the slots, 44 and 46, that are tightened to pre-load the ball bearings, 16 and 18, against the leadscrew 12.

Although the body 42 is shown in FIG. 2 as being an assembly of two separate parts, 48 and 50, it will be understood that the housing member 40 can be a single body as well. Preferably, in this embodiment, both of the slots, 44 and 46, are oriented with the tracking angle in the same direction with respect to the axis 38 of rotation of the leadscrew 12 whereas the first and second slots, 44 and 46, are oriented with opposing, but equal, helix angles with respect to the leadscrew 12. In addition, both of the slots, 44 and 46, are tilted with respect to the tracking angle so that when the ball bearings, 16 and 18 are inserted within the slots, 44 and 46, the inner races, 24 and 26, of the ball bearings, 16 and 18, are properly disposed to engage the leadscrew 12 at opposite sides thereof. For example, the first ball bearing 16 may have, as shown in FIG. 1, the inner race 24 thereof contacting the thread of the leadscrew 12 along the bottom side thereof whereas the second ball bearing 18 has the inner race 26 thereof contacting the top of the leadscrew thread. By such an arrangement the leadscrew 12 is axially disposed within the housing 40 but nonetheless is able to rotate freely because of the rotation of the inner races, 24 and 26, of the two ball bearings, 16 and 18. In order to allow engagement and contact between the external thread 14 and the inner races, 24 and 26, the edges, 34 and 36, are chamfered.

Figure 3:
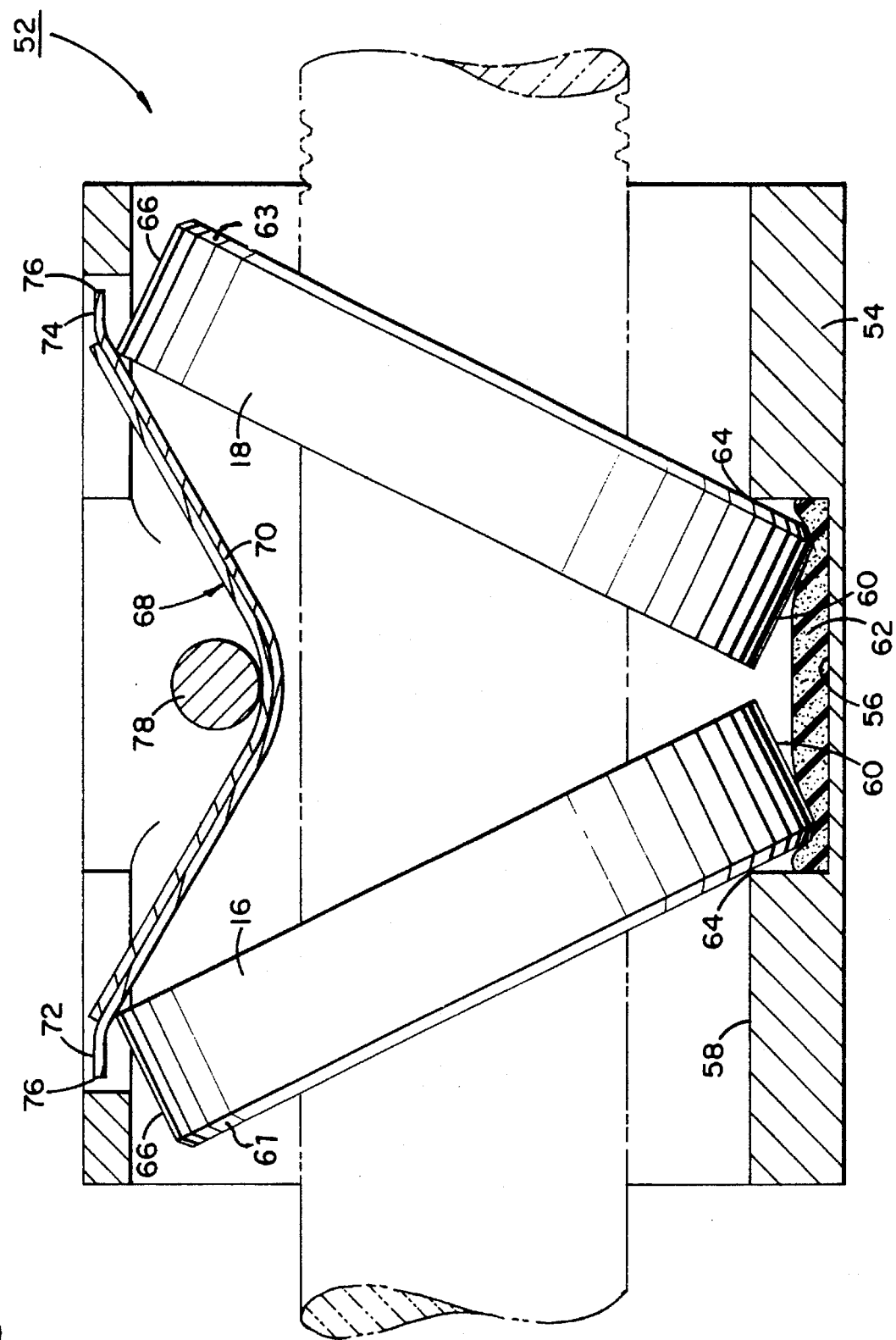
FIG. 3 which is a cross-sectional view of another embodiment of a leadscrew assembly embodying the principles of the present invention.
Figure 4:
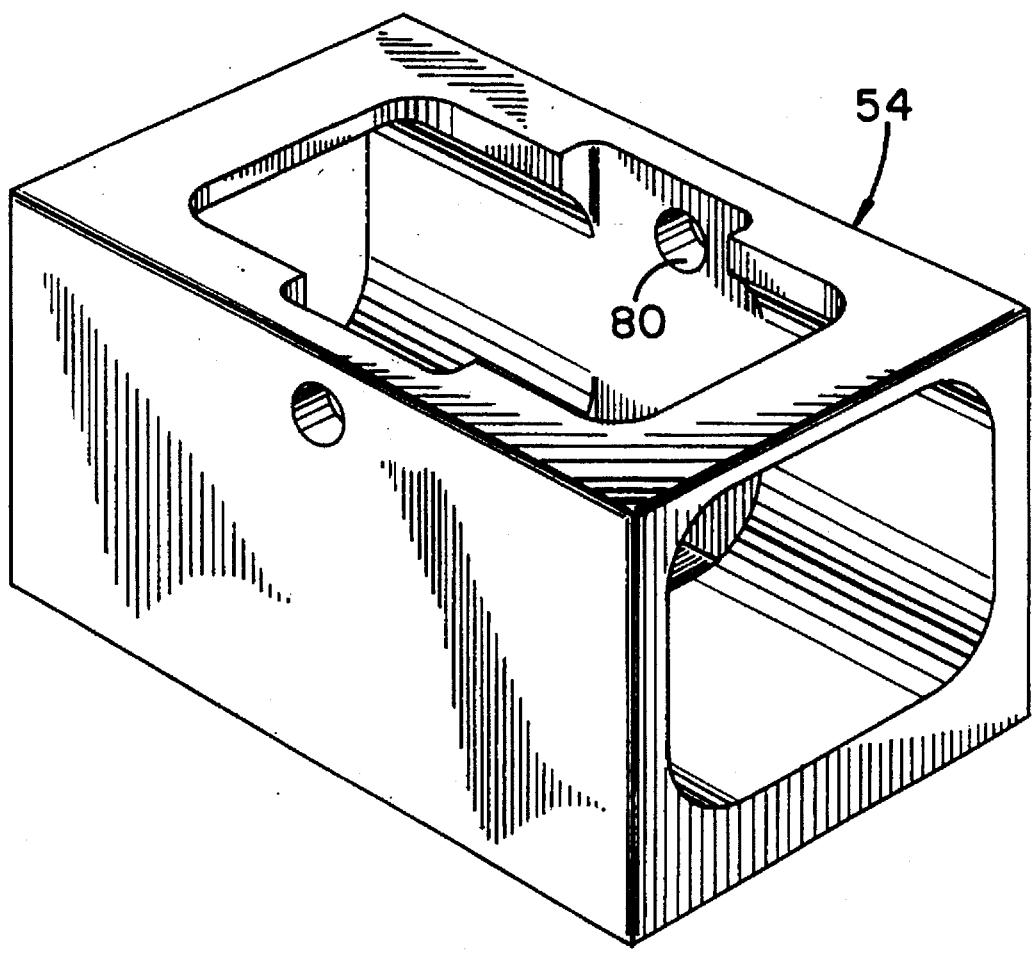
FIG. 4 which is housing particularly adapted for use in conjunction with the embodiment of the present invention shown in FIG. 3.

A second embodiment of a leadscrew assembly, generally indicated at 52 in FIGS. 3 and 4 and embodying the principles of the present invention, includes first and second ball bearings, 16 and 18, respectively, that are disposed such that the tracking angles thereof are equal, but opposite to each other with respect to a plane perpendicular to the axis 38 of rotation of the leadscrew 12. In this embodiment, the housing 54, shown in FIG. 4, includes a recess 56 along a bottom wall 58 thereof to receive therein one end 60 of the ball bearings, 16 and 18. Preferably, the recess 56 includes a layer 62 of compliant or spongy material such as, for example, a sheet of rubber.

In this embodiment, the outer edges 61, 63 of the outer races, 28 and 30 of the ball bearings, 16 and 18, are chamfered. The ball bearings, 16 and 18, are disposed such that the chamfered outer edges 61, 63 are facing away from each other and toward the upper corners 64 of the recess. The other ends 66 of the ball bearings, 16 and 18, are held in position by a leaf spring arrangement 68 that contacts the outside of the other ends 66 of the ball bearings, 16 and 18. In this particular embodiment, a leaf spring 70 having first and second ends, 72 and 74, respectively, is disposed within the inside surface 76 of the housing 54 is retained in tension by a retention pin 78 adapted to fit into corresponding openings 80 in the housing 54. One particular advantage of this embodiment is that the housing 54 is less expensive than the housing 40 shown in FIG. 2 and the assembly of the leadscrew assembly 52 is more rapid. Additionally, this embodiment provides a constant pre-loading with a self aligning tracking angle for the two engaging ball bearings by the leaf spring.

A third embodiment of a leadscrew assembly, generally indicated at 82 in FIG. 5 and embodying the principles of the present invention, includes first, second and third ball bearings, 84, 86 and 88, respectively. The first and second ball bearings, 84 and 86, respectively, are disposed such that the tracking angles thereof are equal, but opposite to each other with respect to a plane perpendicular to the axis 38 of the leadscrew 12. The third ball bearing 88 is preferably disposed between the first and second ball bearings, 84 and 86, respectively, and oriented such that the surface 90 of the inner race 92 is substantially parallel with the surface of the threads of the leadscrew 12.

The lower ends 94 of the first and second ball bearings, 84 and 86, respectively, contact first and second portions, 96 and 98, respectively, of the bottom 100 of the housing 102 on opposite sides, 104 and 106, of a recess 108 extending into the bottom 100. Preferably, the portions, 96 and 98, are provided with a layer 110 of compliant or spongy material. The lower ends 94 of the first and second ball bearings, 84 and 86, respectively, are retained at the tracking angle by first and second pins, 112 and 114, respectively, affixed within the housing 102.

The upper ends, 116 and 118, respectively, of the first and second ball bearings, 84 and 86, respectively, are urged to remain at the tracking angle by the first and second ends, 120 and 122, respectively of a leaf spring 124 that is retained in tension by first and second spring pins, 126 and 128, respectively. As described to this point, the first and second ball bearings, 84 and 86, respectively, function quite similar to the first and second ball bearings, 16 and 18, respectively, of the leadscrew assembly 52 discussed above.

In this embodiment, the lower end 130 of the third ball bearing 88 extends into the recess 108 and the surface 90 of the inner race 92 is urged against the leadscrew 12 by the middle section 132 of the leaf spring 124. By this arrangement the precision of the tracking of the leadscrew 12 by the first and second ball bearings, 84 and 86, respectively, is improved by the preloading of the leadscrew 12 by the third ball bearing 88.

It will be understood that the present leadscrew assemblies, 10, 52 and 82, are advantageous in that, at the point of engagement of the leadscrew 12 and the ball bearings, 16 and 18 there is only a rolling contact between the components. Therefore, the wear is minimal. Further, friction is higher at the contact of the bearings, i.e., the inside diameter and shoulder of the inner race, and the leadscrew 12 than between the inner race and the outer race of the ball bearings. The leadscrew 12 drives the inner races, 28 and 30, while it is tracking the thread profile which in turn moves the housing, 40 or 54, of the bearings axially. The two bah bearings, 16 and 18, are loaded against the thread 14, or profile, of the leadscrew 12 and against each other. All the pre-load forces and additional axial loads are confined to the races of the two ball bearings. Further, lubrication of this leadscrew assembly, 10 and 52, can be confined to the ball bearings only and, depending upon the speed for which the assembly is utilized, may not be necessary at all. Further, it will be understood that although the leadscrew assemblies, 10, 52 and 82, have been shown and discussed herein as having two ball bearings, a single bail bearing, for example, bail bearing 16, could also be used alone to provide a leadscrew assembly according to the principles of the present invention.

The leadscrew assemblies, 10 and 52, as described herein not only overcome the drawbacks of conventional leadscrew assemblies, but are capable of extreme precision.

Although the present invention has been discussed in detail with respect to one or more specific embodiments it will be understood that other embodiments arrangements and configurations may be made without departing on the spirit and scope of the invention. Hence, the present invention is deemed limited only by the appended claims and the reasonable interpretation thereof.

What is claimed is:

1. A leadscrew assembly comprising:

a leadscrew having an external thread;

at least one ball bearing, said ball bearing being of the type having inner race and outer race and being disposed such that a segment of the inner race contacts diametrically opposing portions of said leadscrew; and a housing having means for retaining said ball bearings in a preselected position with respect to said leadscrew, wherein said retention means includes first and second slots.

2. The assembly as claimed in claim 1 wherein said at least one ball bearing includes first and second ball bearings disposed such that a segment of each of the inner races thereof contacts diametrically opposing portions of said leadscrew.

3. The assembly as claimed in claim 2, wherein said first and second ball bearings include a plurality of balls disposed between said inner and outer races.

4. The assembly as claimed in claim 2 wherein said first and second ball bearings are disposed at the same tracking angle as said external thread.

5. The assembly as claimed in claim 4 wherein said first and second ball bearings are disposed at the same helix angle as said external thread.

6. The assembly as claimed in claim 5 wherein said first and second ball bearings are disposed at the same helix angle as said external thread but at opposite angles with respect to the axis of rotation of said leadscrew such that said first and second ball bearings engage the lower and contact the upper portions of said external thread.

7. The assembly as claimed in claim 1, wherein said retention means further comprises means for securing said ball bearings in said slots.

8. The assembly as claimed in claim 1 having a recess for receiving one end of said first and second ball bearings; and
means for retaining said first and second ball bearings at the same tracking angle as said leadscrew but at opposite angles with respect to the axis of rotating of said leadscrew.

9. The assembly as claimed in claim 8 wherein said retaining means includes a leaf spring.

10. The assembly as claimed in claim 9 further comprising a retention pin, said retention pin being disposed in said housing such that it maintains said leaf spring in tension against said first and second ball bearings.

11. The assembly as claimed in claim 8 wherein said recess extends into the bottom wall of said housing said recess being disposed substantially perpendicular to the axis of rotation of said leadscrew.

12. The assembly as claimed in claim 11 wherein said recess further comprises a layer of compliant material disposed therein such that one end of said ball bearings contact said layer of compliant material.

13. The assembly as claimed in claim 6 further comprising:
means for urging said leadscrew against said first and second ball bearings.

14. The assembly as claimed in claim 13 wherein said urging means includes a third ball bearing having an inner race, said third ball bearing being disposed such that said inner race is substantially parallel with the axis of said leadscrew and in contact therewith.

15. The assembly as claimed in claim 14 wherein said third ball bearing is disposed between said first and second ball bearings along the axis of said leadscrew.

16. The assembly as claimed in claim 14 further comprising: means for retaining said first and second ball bearings in a preselected position with respect to said leadscrew and for urging said inner race of said third ball bearing against said leadscrew.

17. The assembly as claimed in claim 16 wherein said retaining means and said inner race urging means is a single leaf spring.

18. The assembly as claimed in claim 17 further comprising a housing, said housing having a recess in the bottom wall thereof wherein said third ball bearing freely extends.

19. The assembly as claimed in claim 2 wherein said inner races of said ball bearings are chamfered.

20. The assembly as claimed in claim 2 wherein said outer races of said ball bearings are chamfered.

21. A leadscrew assembly comprising:
a leadscrew having an external thread; and
first and second ball bearings disposed such that a segment of each of the inner races thereof contacts diametrically opposing portions of said leadscrew, said ball bearing being of the type having inner race and outer race and being disposed such that a segment of the inner race contacts diametrically opposing portions of said leadscrew;
a housing having retaining means for retaining said ball bearings in a preselected position with respect to said leadscrew, said retaining means comprising:
a recess for receiving one end of said first and second ball bearings;
means for retaining said first and second ball bearings at the same tracking angle as said leadscrew but at opposite angles with respect to an axis of rotating of said leadscrew; and
a leaf spring; and
retention pin disposed in said housing such that it maintains said leaf spring in tension against said first and second ball bearings.

22. A leadscrew assembly comprising:
a leadscrew having an external thread; and
first and second ball bearings disposed such that a segment of each of the inner races thereof contacts diametrically opposing portions of said leadscrew, said ball bearing being of the type having inner race and outer race and being disposed such that a segment of the inner race contacts diametrically opposing portions of said leadscrew;
a housing having retaining means for retaining said ball bearings in a preselected position with respect to said leadscrew, said retaining means comprising:
a recess for receiving one end of said first and second ball bearings, wherein the recess extends into the bottom wall of said housing and is disposed substantially perpendicular to an axis of rotation of said leadscrew;
means for retaining said first and second ball bearings at the same tracking angle as said leadscrew but at opposite angles with respect to an axis of rotating of said leadscrew.

23. A leadscrew assembly comprising:
a leadscrew having an external thread; and
first and second ball bearings disposed such that a segment of each of the inner races thereof contacts diametrically opposing portions of said leadscrew, said ball bearing having an inner race and an outer race disposed such that a segment of the inner race contacts diametrically opposing portions of said leadscrew, and wherein said first and second ball bearings are disposed at the same tracking angle as said external thread, and wherein said first and second ball bearings are disposed at the same helix angle as said external thread but at opposite angles with respect to an axis of rotation of said leadscrew such that said first and second ball bearings engage the upper and lower portions of said external thread;
means for urging said leadscrew against said first and second ball bearings which includes a third ball bearing having an inner race, said third ball bearing being disposed such that said inner race is substantially parallel with the axis of said leadscrew and in contact therewith.

24. The assembly as claimed in claim 23 wherein said third ball bearing is disposed between said first and second ball bearings along the axis of said leadscrew.

25. The assembly as claimed in claim 23 further comprising: means for retaining said first and second ball bearings in a preselected position with respect to said leadscrew and for urging said inner race of said third ball bearing against said leadscrew.

26. The assembly as claimed in claim 25 wherein aid retaining means and said inner race urging means is a single leaf spring.

27. The assembly as claimed in claim 26 further comprising a housing, said housing having a recess in the bottom wall thereof wherein said third ball bearing freely extends.

* * * * *

UNITED STATES PATENT AND TRADEMARK OFFICE
CERTIFICATE OF CORRECTION

PATENT NO. : 5,533,417
DATED : July 9, 1996
INVENTOR(S) : Gabor Devenyi It is certified that error appears in the above-identified patent and that said Letters Patent is hereby corrected as shown below:

```
          On title page,
          item [75], delete "Pentang" and insert therefor
--Penetang--.

Col. 3, line 33, delete "comers" and insert therefor
--corners--.

Col. 4, line 30, delete "bah" and insert therefor --ball--;
           line 40, delete "bail" and insert therefor --ball--;
and
           line 41, delete "bail" and insert therefor --ball--.
```

Signed and Sealed this

Thirty-first Day of December, 1996

*Attest:*

BRUCE LEHMAN

*Attesting Officer*      *Commissioner of Patents and Trademarks*